United States Patent [19]

Green

[11] 4,067,136
[45] Jan. 10, 1978

[54] ANIMAL TRAP

[76] Inventor: Andrew J. Green, P.O. Box 70, Salem, N. Mex. 87941

[21] Appl. No.: 731,098

[22] Filed: Oct. 8, 1976

[51] Int. Cl.² .................................................. A01M 23/26
[52] U.S. Cl. .................................................................. 43/93
[58] Field of Search .................. 43/80, 93, 94, 92, 90, 43/88, 97, 95

[56] References Cited

U.S. PATENT DOCUMENTS

| 371,727 | 10/1887 | Alexander | 43/93 |
|---|---|---|---|
| 407,129 | 7/1889 | Seymour | 43/93 |
| 1,528,647 | 3/1925 | Anderson | 43/80 |
| 1,972,641 | 9/1934 | Barrett | 43/80 |
| 2,110,156 | 3/1938 | Johnson | 43/88 |

Primary Examiner—Warner H. Camp
Attorney, Agent, or Firm—Cushman, Darby & Cushman

[57] ABSTRACT

An animal trap has an elongated base member; a pair of opposed trap jaws are disposed longitudinally of the base member and pivotally connected at their end portions to corresponding end portions of the base member for relative pivotal movement; a spring member is secured to the base member and operable to pivot the jaws from an open position to a closed position where they will entrap an animal; a jaw release member pivotally is secured at one end to an end portion of the base member for movement from a substantially vertical position wherein it engages and holds the jaws open, to an outwardly extending position where it leaves the jaws free to close, the member has protrusions thereon which engage and hold the jaws open until the release member is struck by the head of an animal so as to cause the release member to pivot outwardly away from the jaws thus releasing the jaws to capture the animal therebetween.

2 Claims, 2 Drawing Figures

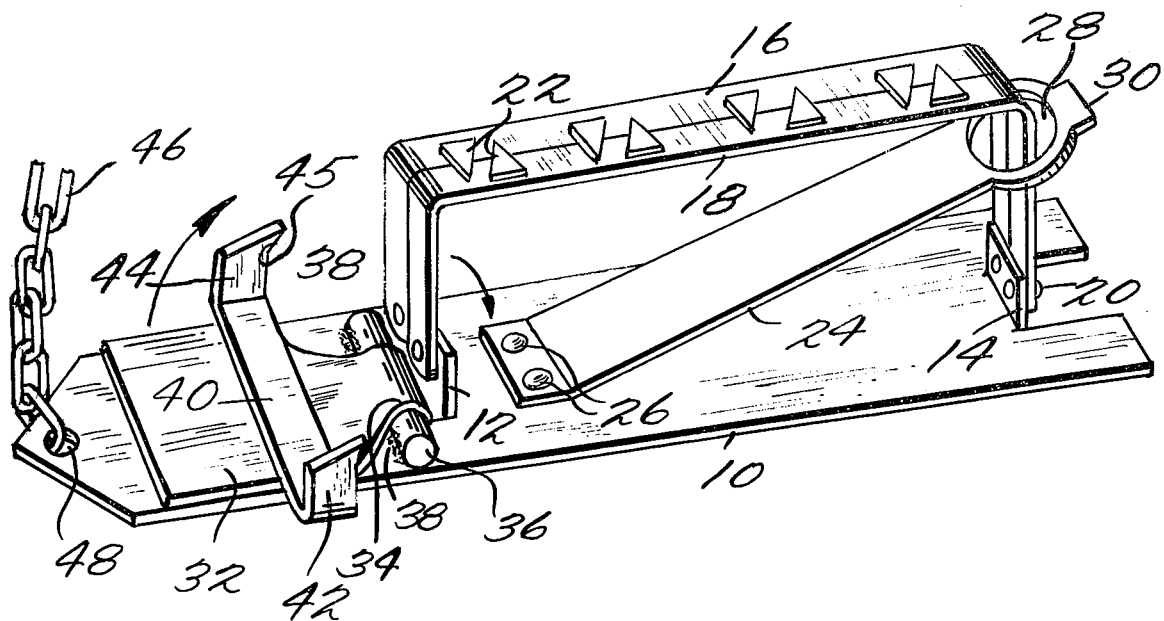
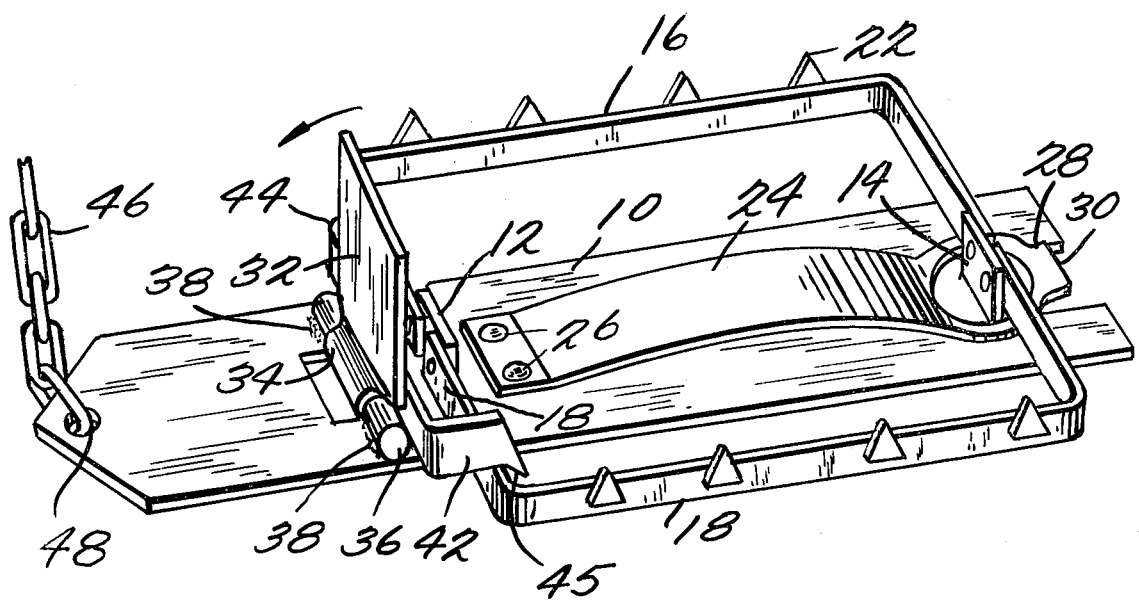

ND ANIMAL TRAP

BACKGROUND OF THE DISCLOSURE

1. Field of the Invention

This invention relates generally to animal traps, and more particularly to traps for gopher and other rodent animals, which are used in the burrows or runways tunneled through the ground by such animals.

2. Prior Art

Conventional animal traps are all of basically similar design in that they all possess some means for impaling or capturing an animal usually between a pair of jaws or piercing members which are moved from an open to a closed position usually by some powerful spring force, upon release of a trigger mechanism which is activated by the animal. Usually the trigger mechanism is disposed in the center of the jaws so that when an animal steps onto the release mechanism the jaws close about the leg or body of the animal so as to capture it.

In the case of traps particularly useful in the capture of gophers and other rodent like animals, however, many of these conventional types of traps have proved to be unsuccessful in that when they are activated by such an animal who steps its foot onto the central release mechanism, the animal is often fast enough or by instinctive reflex, jumps away from the trap prior to its closing. In addition, since gophers and similar animals are small compared to other long-legged animals for which such conventional traps are used, traps are usually designed to catch the body of the animal as opposed to its legs. With central release members disposed between the jaws the animal is only partially exposed to the trap when his forefeet or hindfeet, depending upon which way the animal is moving through the tunnel in which the trap is disposed, activate the release and thus the animal is already half way out of the trap when he jumps thus reducing the possibility of his capture by the closing jaws.

SUMMARY OF THE INVENTION

The present invention provides a unique mechanism whereby the entire body of a rodent, such as a gopher, will be positioned inside the trap before the release mechanism is activated to release the jaws to close on the animal, thus substantially enhancing the effectiveness of the trap for use in catching rodents of the type which run in burrows or tunnels in the ground.

This mechanism comprises an elongated base member; a pair of opposed trap jaws which are disposed longitudinally of the base member and pivotally connected at their ends to corresponding end portions of the base member for relative pivotal movement transverse to the base member; a spring mechanism secured to the base member and operable to pivot the jaws from an open position substantially parallel to the base member to a closed position in abutting relationship perpendicular to the base member and which will engage the animal who has tripped the release mechanism; a jaw release means having a release member pivotally secured at one end portion thereof to an end portion of the base member for movement from a first position substantially perpendicular to the base member externally adjacent the jaws to a second position outwardly from the base member away from the jaws, and having jaw engaging protrusions which extend perpendicularly from the release member in the direction of the jaws when the release member is in the first position, for engaging and holding the jaws in the open position and for releasingly disengaging the jaws when the release member is pivoted away from the jaws so as to permit the jaws to be moved towards the closed position by the spring means so as to capture the animal in the jaws.

BRIEF DESCRIPTION OF THE DRAWINGS

FIG. 1 is an illustration in perspective of a preferred embodiment of the present invention with the trap jaws in the closed position and the release member in the outwardly extended position;

FIG. 2 is another perspective view of the embodiment illustrated in FIG. 1 with the jaws in the open position and the release member in a vertical position where it holds the jaws open.

DETAILED DESCRIPTION OF THE PREFERRED EMBODIMENT

Referring to FIGS. 1 and 2, the main base plate 10 is preferably an elongated metal plate with upwardly extending portions which form brackets 12 and 14 to which the jaws 16 and 18 are pivotally secured by rivets 20 or the like.

The jaws 16 and 18 are preferably constructed of sheet metal and have teeth 22 either integrally formed or welded thereto which mesh so as to permit the trap to close completely and which are pointed so as to pierce the hide of an animal captured in the trap. However, it is to be noted that the teeth are not essential, in that the side surfaces of the jaws 16 and 18 themselves under the pressure of the spring forcing them together, should be sufficient to maintain an animal captured in the trap.

The preferred spring means 24 is a spring steel plate mounted by rivets 26 to the base plate 10 and so formed that the opening 28 formed in the opposite end portion from where it is secured to the base plate 10 will encompass the vertical end portion of each of the jaws 16 and 18 and will engage the outer edges of the jaws to hold the jaws together in the closed position. A tab 30 is preferably provided on the end portion containing opening 28 so that the trap may be set by a person pushing down on the tab 30 as he opens the jaws 16 and 18. Preferably there should be sufficient distance between the outer edges of the jaws when they are in the fully opened position as illustrated in FIG. 2, to permit the spring to fit between the lower edges of the jaws and the upper surface of the base plate 10 while the trap is opened. Although the above described spring means is the preferred one, many other types of spring mechanisms can be used to effect the desired movement.

The release member 32 is a metal plate which has its end portion 34 formed into a cylindrical shape through which the pin 36 can be inserted. The ends of pin 36 may be welded to the base member 10, as at welds 38. The end portion of base member 10 has two cylindrically shaped portions formed therein through which the pin 36 is inserted so that the release member 32 can be rotated from a substantially vertical position adjacent the outside surfaces of the jaws to an outwardly extended position as shown in FIG. 1.

Secured to the release member 32 is a U-shaped member 40 which provides protruding end portions 42 and 44. Alternatively, the protrusions 42 and 44 may be integral parts of the release member 32, depending upon the desired form of construction.

As illustrated in FIG. 2, the protrusions 42 and 44 rest on the upper edges of jaws 16 and 18 when the release plate 32 is disposed in a substantially vertical position. This position prevents the closing of jaws 16 and 18 by the spring 24 until the release member 32 is pivoted outwardly in the direction shown by the arrow in FIG. 2 so as to cause the protrusions 42 and 44 to disengage the jaws of the trap to capture the animal. The lower outer edges of protrusions 42 and 44 have inclined portions 45 to prevent the jaws 16 and 18 from rotating the member 32 under the force of spring 24. The surfaces 45 should lie in a direction which is at 90 degrees to a line from the surface to the center of pin 36. In this configuration the upward force on jaws 16 and 18 cannot itself rotate member 32 about pin 36, and force from the animal will be required to rotate member 32 to release the jaws 16 and 18.

A chain 46 may be optionally provided and secured to base member 10 at hole 48 so that the trap can be staked to the ground to prevent the animal from running away from the trap or the trap being lost down a tunnel or burrow.

In operation, the trap will be positioned just inside the opening of a tunnel or burrow where the animal is expected to exit so that the release plate 32 is nearest the opening. This positioning assures that as the animal attempts to exit the burrow either moving head first or tail first it will be totally within the jaws prior to activation of the release mechanism. When an animal attempts to dislodge the trap which is an obstacle in his path, he will push the release plate 32 outwardly from the jaws 16 and 18 causing protrusions 42 and 44 to rotate upwardly and outwardly away from the jaws. This will then permit the spring 24 to move upwardly causing the jaws to move from their open position, as illustrated in FIG. 2, to the closed position, illustrated in FIG. 1, which rapid movement will cause the jaws to close on the animal thus capturing it.

To set the trap, the spring 24 is pushed downwardly by exerting pressure on tab 30, the jaws 16 and 18 are then opened, and the release plate 32 is then pivoted upwardly to a substantially vertical position where the protrusions 42 and 44 engage the upper edge portions of the jaws 16 and 18, at which point the pressure being applied to tab 30 may be removed since the jaws will be retained in the open position by the protrusions on release member 32.

Although the foregoing is the preferred embodiment of the present invention, it will be obvious to those skilled in the art that variations are possible. All such variations as would be obvious to one skilled in this art are intended to be encompassed by the present invention as defined by the following claims.

What is claimed is:

1. An animal trap comprising:
    an elongated base member,
    a pair of opposed trap jaws each disposed to extend longitudinally of said base member, each of said jaws being pivotally connected at their ends to the base member for relative pivotal movement with respect thereto towards and away from each other between an open and closed position,
    spring means secured to said base member and in engagement with said trap jaws for constantly urging said trap jaws toward said closed position, and
    a jaw release member including a plate portion and having one end thereof pivotally secured to said base member for rotation about an axis which extends perpendicular to the longitudinal direction of and substantially in the plane of said base member, between a first position with said plate portion extending substantially perpendicular to the base member and wherein said release member engages said jaws to restrain said jaws from closing, to a second position outwardly from said base member away from said jaws, said plate portion being of a size such that, when said trap is placed in a burrow, said plate portion, in said first position, will obstruct passage through said burrow and an animal engaging said plate portion will operate said jaw release member with its nose when its body is within the region whereat the jaws will converge.

2. An animal trap as defined in claim 1, wherein the release member includes protrusions extending from each side portion of the release member to engage upper surfaces of the jaws when they are in the open position.

* * * * *